United States Patent [19]

Hattori et al.

[11] Patent Number: 4,696,552
[45] Date of Patent: Sep. 29, 1987

[54] PROJECTION DEVICE WITH REFRACTIVE INDEX DISTRIBUTION TYPE LENS

[75] Inventors: Jun Hattori, Yokohama; Shigeyuki Suda, Tokyo, both of Japan

[73] Assignee: Canon Kabushiki Kaisha, Tokyo, Japan

[21] Appl. No.: 879,504

[22] Filed: Jun. 26, 1986

Related U.S. Application Data

[63] Continuation of Ser. No. 767,868, Aug. 21, 1985, abandoned.

[30] Foreign Application Priority Data

Aug. 28, 1984 [JP] Japan ................................. 59-178580
Feb. 22, 1985 [JP] Japan ................................. 60-34784

[51] Int. Cl.⁴ .......................... G02B 3/00; G02B 5/14
[52] U.S. Cl. ................................ 350/413; 350/96.18; 350/96.31; 355/1
[58] Field of Search .............. 350/96.18, 96.19, 96.29, 350/96.30, 96.31, 413, 416; 355/1

[56] References Cited

U.S. PATENT DOCUMENTS

| | | | |
|---|---|---|---|
| 3,658,407 | 4/1972 | Kitano et al. | 355/1 |
| 3,666,347 | 5/1972 | Kitano et al. | 350/416 |
| 3,909,110 | 9/1975 | Marcuse | 350/96.31 |
| 4,373,780 | 2/1983 | Lama | 355/1 |
| 4,435,064 | 3/1984 | Tsukada et al. | 355/1 |
| 4,462,662 | 7/1984 | Lama | 355/1 |
| 4,527,886 | 7/1985 | Inamori et al. | 355/1 |

*Primary Examiner*—John K. Corbin
*Assistant Examiner*—Paul M. Dzierzynski
*Attorney, Agent, or Firm*—Fitzpatrick, Cella, Harper & Scinto

[57] ABSTRACT

A projection device has an illuminating system for illuminating an object, and an index distribution type lens for projecting the image of the object. The lens has a refractive index distribution substantially proportional to the square of the distance from the optic axis in a cross-section perpendicular to the optic axis and a refractive index distribution monotonously varying in the direction of the optic axis.

11 Claims, 4 Drawing Figures

PROJECTION DEVICE WITH REFRACTIVE INDEX DISTRIBUTION TYPE LENS

This application is a continuation of application Ser. No. 767,868, filed Aug. 21, 1985, now abandoned.

BACKGROUND OF THE INVENTION

1. Field of the Invention

This invention relates to a projection device using a so-called index distribution type lens array in which the refractive index varies continuously.

2. Description of the Prior Art

Various projection devices in which a number of lenses having a refractive index distribution in a direction orthogonal to the optic axis are disposed proximate to one another and which forms the image of an object on a predetermined surface are known as reading apparatuses of facsimile, imaging optical systems of copying apparatuses, and the like. Particularly, index distribution type lens arrays having an erect one-to-one magnification imaging action are widely used because the distance TC between an object and the formed image thereof is short to enable an optical system to be made compact.

In apparatuses using these index distribution type lens arrays, there is a strong desire to shorten the distance between the object and the formed image thereof to make the apparatuses more compact. On the other hand, in a copying apparatus, a facsimile apparatus or the like, the distance between the original carriage and the end surface of the lens array must be a predetermined length or more from the necessity of illuminating the original carriage by an illuminating system. To meet these two requirements which are contrary to one other, it would occur to mind to form the lens array by the use of a medium in which the refractive index difference $\Delta n$ between the central portion and the marginal portion of the index distribution type lens is great and the refractive index gradient is sharp, but there has been a technical limit in making a lens having great $\Delta n$.

SUMMARY OF THE INVENTION

It is an object of the present invention to provide a projection device in which the distance between an object and the formed image thereof can be shortened and the space occupied by an illuminating system can be sufficiently secured.

It is a further object of the present invention to provide a projection device provided with an index distribution type lens which is easy to make.

In the projection device according to the present invention, a lens used as imaging means is endowed with a refractive index distribution not only in a plane perpendicular to the optic axis but also in the direction of the optic axis, thereby achieving the above objects. More particularly, said lens is endowed with a refractive index distribution substantially proportional to the square of the distance from the optic axis in a cross-section perpendicular to the optic axis and a refractive index distribution substantially monotonously varying in the direction of the optic axis. By endowing the lens with such refractive index distributions, it is possible to shorten the distance between the object and the formed image thereof without deteriorating the imaging characteristic. Further, for example, in a copying apparatus or the like, the distance between the object (original carriage) and the lens can be made to differ from the distance between the lens and the image plane (photosensitive medium) when the conjugate relation between the object and the formed image thereof is kept. Also, in a facsimile apparatus or the like, the distance between the surface of an original which is the object and the lens can be made to differ from the distance between the lens and a photoelectric conversion element or a CCD disposed at the image plane position when the conjugate relation between the object and the formed image thereof is kept. Accordingly, by making the distance between the object provided with an illuminating system and the lens greater than the distance between the lens and the image plane, it is possible to secure a space in which the illuminating system is disposed and shorten the distance between the object and the formed image thereof and thus, it becomes possible to make the device more compact.

Also, even in an index distribution type lens used in a projection device having the same distance between the object and the formed image thereof, the maximum refractive index difference $\Delta n$ in the radial direction can be reduced, and this makes the index distribution type lens easy to manufacture.

DESCRIPTION OF THE PREFERRED EMBODIMENTS

Figure 1:
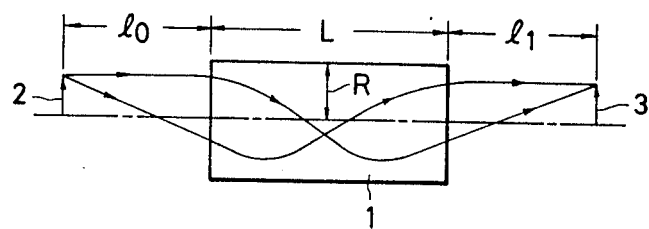
FIG. 1 illustrates an index distribution type lens used in a projection device according to the prior art.

FIG. 1 shows the manner of the erect one-to-one magnification imaging by a conventional index distribution type lens whose refractive index depends only on the distance from the optic axis and is reduced substantially in the form of a quadratic curve from the center toward the marginal portion of the lens. The index distribution type lens 1 has a full length L and a radius R, and the erect one-to-one magnification image 3 of an object 2 lying at a distance $l_0$ ahead of the lens 1 whose both end surfaces are planar is formed at a position of distance $l_1$ rearward of the lens 1.

Now, the refractive index distribution of the conventional index distribution type lens 1 is represented by the following equation:

$$n(r) = n_{00} + n_{10}r^2 \qquad (1),$$

where r is the distance from the optic axis, $N_{00}$ and $n_{10}$ are constants and $N_{10} < 0$. At this time, $l_0$, $l_1$ and TC are:

$$l_0 = l_1 = -\frac{1}{n_{00} \cdot a} \cdot \frac{aL}{2} \qquad (2)$$

$$TC = l_0 + l_1 + L \qquad (3)$$

where $$a = \sqrt{-\frac{2n_{10}}{n_{00}}} \qquad (4)$$

As can be seen from the foregoing equations, it is a feature that the distance $l_0$ between the object 2 and the lens 1 is equal to the distance $l_1$ between the lens 1 and the image plane 3. Here, if desired values of TC and $l_0$ are given, the values of the full length L and a which satisfy them are found from the foregoing equations, and if TC is reduced while $l_0$ is kept at a constant value, L becomes smaller and a becomes greater. That is, the refractive index difference $\Delta n = |n_{10} \cdot R2|$ between the portion on the optic axis and the marginal portion far from the optic axis in a cross-section perpendicular to the optic axis becomes greater and the manufacture of the medium becomes gradually difficult and the refractive index difference becomes greater and therefore, the variation in the direction of travel of the light beam in the lens becomes sharper (greater) and the aberration characteristic tends to be readily deteriorated.

Table 1 below shows an example of the numerical values of TC=42.5 mm and $l_0$=18 mm as a conventional example. In this example, a medium in which $\Delta n$=0.049 is necessary.

TABLE 1

| TC | $l_0$ | $l_1$ | L | $n_{00}$ | $n_{10}$ | $\Delta n$ | R |
|---|---|---|---|---|---|---|---|
| 42.5 | 18 | 18 | 6.5 | 1.55 | −0.19774 | 0.049 | 0.5 |

Figure 2:
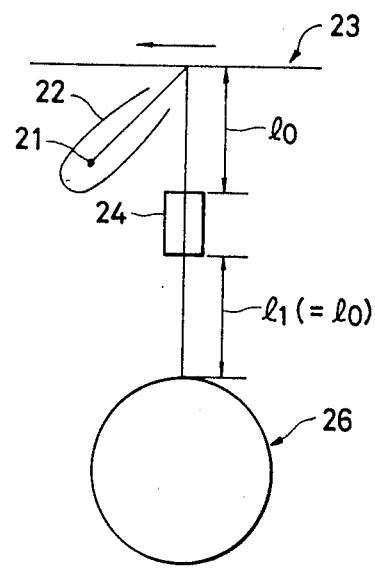
FIG. 2 shows an embodiment of the copying apparatus using the projection device according to the prior art.

An example of the copying apparatus using a conventional projection device provided with the index distribution type lens as described above is shown in FIG. 2. In FIG. 2, reference numeral 21 designates a bar-like light source such as a halogen lamp, which extends in a direction perpendicular to the plane of the drawing sheet. Reference numeral 22 denotes a reflector for condensing the light beam from the halogen lamp on an original carriage 23. The original carriage 23 is moved in the direction of arrow, whereby an original thereon is scanned. Reference numeral 24 designates an index distribution type array lens in which the index distribution lenses 1 shown in FIG. 1 are arranged in the form of an array in a direction perpendicular to the plane of the drawing sheet, and reference numeral 25 denotes an index distribution type array lens in which the index distribution lenses 11 shown in FIG. 2 are arranged in the form of an array in a direction perpendicular to the plane of the drawing sheet. The index distribution type array lens 25 forms an erect one-to-one magnification image of the original. Reference numeral 26 designates a photosensitive drum on which the image of the original is formed by the array lenses. Around the photosensitive drum 26, there are disposed unshown members for forming the latent image of the original on the photosensitive drum, visualizing the latent image, transferring the visualized image to paper and fixing the transferred image on the paper.

As shown in FIG. 2, in the conventional projection device, from the viewpoint of the function of the index distribution type lens, the distance $l_0$ between the original carriage 23 and the array lens 24 is always equal to the distance $l_1$ between the array lens 24 and the photosensitive drum 26, and if an attempt is made to increase the refractive index difference $\Delta n$ of the index distribution type lens and reduce the distance between the object and the formed image thereof, it has proved a hindrance to the arrangement of the illuminating system, i.e., the bar-like light source 21 and the reflector 22. Also, it is difficult in the method of manufacture to increase the refractive index difference $\Delta n$ itself.

Description will hereinafter be made of an index distribution type lens applied to the projection device according to the present invention.

Figure 3:
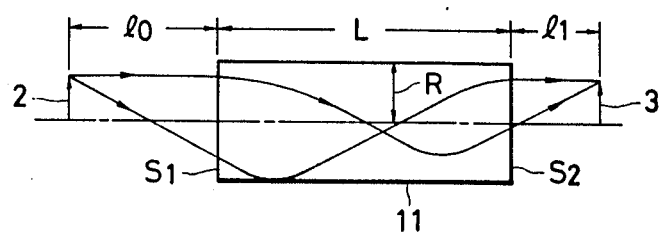
FIG. 3 illustrates an index distribution type lens used in the projection device of the present invention.

FIG. 3 shows the manner of the erect one-to-one magnification imaging by the index distribution type lens applied to the projection device according to the present invention. Reference numeral 11 designates the index distribution type lens applied to the present invention. In FIG. 3, symbols and reference numerals similar to those in FIG. 1 are similar in significance to those in FIG. 1.

The refractive index distribution of the lens 11 used in the present invention is substantially proportional to the square of the distance r from the optic axis in any transverse cross-section perpendicular to the optic axis and depends on the distance x measured in the direction of the optic axis from the forward end surface S1 of the lens 11. Such a refractive index distribution n (r, x) is generally expressed as follows:

$$n(r, x) = N_0(x) + N_1(x) \cdot r^2 \qquad (5),$$

where $N_0(x)$ and $N_1(x)$ are the functions of x. The refractive index equation (1) in the previously described example can be considered to be a special case of this equation (5). When $X_1$, $X_2$; $\dot{X}_1$, $\dot{X}_2$ are the heights and angles of the incident and emergent light rays on the forward and rearward end surfaces S1 and S2 of the lens 11, there is the following relation in the paraxial area:

$$\begin{bmatrix} X_2 \\ N_0(L) \cdot \dot{X}_2 \end{bmatrix} = \begin{bmatrix} A(L) & B(L) \\ C(L) & D(L) \end{bmatrix} \begin{bmatrix} X_1 \\ N_0(0) \cdot \dot{X}_1 \end{bmatrix} \qquad (6)$$

where the paraxial characteristic amounts A, B, C and D are the functions of x and they are in the following relations:

$$\left.\begin{array}{l} \frac{dA(x)}{dx} = \frac{C(x)}{N_0(x)} \\ \frac{dC(x)}{dx} = 2N_1(x) \cdot A(x) \end{array}\right\} \qquad (7)$$

$$\left.\begin{array}{l} \frac{dB(x)}{dx} = \frac{D(x)}{N_0(x)} \\ \frac{dD(x)}{dx} = 2N_1(x) \cdot B(x) \end{array}\right\} \qquad (8)$$

where $$\left.\begin{array}{l} A(0) = D(0) = 1 \\ B(0) = C(0) = 0 \end{array}\right\} \qquad (9)$$

This differential equation can be solved by a technique of numerical value calculation to find A, B, C and D.

Next, $l_0$, $l_1$ and TC are expressed as follows by the use of A, B, C and D from the definitions thereof:

$$l_0 = \frac{1 - D(L)}{C(L)} \qquad (10)$$

-continued $$l_1 = \frac{1 - A(L)}{C(L)} \quad (11)$$

$$TC = l_0 + l_1 + L \quad (12)$$

In the previously described case of the prior art, $l_0 = l_1$, whereas in this case, generally $l_0 \neq l_1$.

When it is considered to reduce TC while keeping $l_0$ constant, by giving suitable $N_0(x)$ and $N_1(x)$ to provide $l_0 > l_1$, it is possible to make L great as compared with the previously described example of the prior art and weaken the refractive index gradient in the radial direction.

That is, even if $\Delta n$ (in this case, the maximum refractive index difference in the radial direction) is made relatively small, it is possible to reduce the distance TC between the object and the formed image thereof.

As an example, consider a case where the refractive index $N_0$ on the optic axis does not depend on x and the secondary coefficient $N_1$ of r is proportional to x. This may be expressed by the following equation:

$$n(r,x) = n_{00} + (n_{10} + n_{11}x)r^2 \quad (13),$$

where $n_{00}$, $n_{10}$ and $n_{11}$ are constants.

If the values of $n_{00}$, $n_{10}$, $n_{11}$ and L are given, $l_0$, $l_1$ and TC can be found from equations (7)–(12). Accordingly, if desired TC and $l_0$ are given, the refractive index distribution and the length of the lens which satisfy them can be found by an optimizing technique.

Where the refractive index $N_0(x)$ on the optic axis is also proportional to x, N(r,x) can be expressed as follows:

$$N(r,x) = N_0(x) + N_1(x)r^2 \quad (14)$$

$$= (n_{00} + n_{01}x) + (n_{10} + n_{11} \cdot x)r^2,$$

where $n_{00}$, $n_{01}$, $n_{10}$ and $n_{11}$ are constants. Again in this case, if the values of $n_{00}$, $n_{01}$, $n_{10}$, $n_{11}$ and L are given, $l_0$, $l_1$ and TC can be found from equations (7)–(12).

Embodiments of the index distribution type lens used in the present invention are shown in Table 2 below.

TABLE 2

| Embodiment 1 | Embodiment 2 |
|---|---|
| TC = 40.78 | TC = 42.5 |
| $l_0$ = 18.00 | $l_0$ = 18.00 |
| $l_1$ = 13.90 | $l_1$ = 14.17 |
| L = 8.89 | L = 10.33 |
| $n_{00}$ = 1.52779 | $n_{00}$ = 1.52935 |
| $n_{01}$ = 0.0025 | $n_{01}$ = 0.002 |
| $n_{10}$ = −0.04489 | $n_{10}$ = −0.03788 |
| $n_{11}$ = −0.01720 | $n_{11}$ = −0.01009 |
| $\Delta n$ = 0.049 | $\Delta n$ = 0.036 |
| R = 0.5 | R = 0.5 |

Embodiments 1 and 2 are ones in which the refractive index distribution N(r,x) has the distribution as shown in equation (14). It will be seen that in the lens shown in Embodiment 1, TC is 40.78 which is short as compared with TC shown in Table 1 in a case where the refractive index difference $\Delta n$ is the same as $\Delta n = 0.049$.

It will also be seen that the refractive index difference $\Delta n$ is as small as 0.036 when TC=42.5 which is the same value as that in the conventional lens is assumed as shown in Embodiment 2. $\Delta n$ herein referred to is x=L, that is, the refractive index difference in the radial direction on the rear end surface of the lens. Thus, when the refractive index gradient is weak, the aberrations created are generally small. Accordingly, if $\Delta n$ is small, it will lead to ease of manufacture and an advantage in the correction of the aberrations.

Embodiments 3 and 4 shown in Table 3 below are ones in which the refractive index distribution N(r,x) has the distribution as shown in equation (13).

TABLE 3

| Embodiment 3 | Embodiment 4 |
|---|---|
| TC = 40.85 | TC = 42.5 |
| $l_0$ = 18.00 | $l_0$ = 18.00 |
| $l_1$ = 13.94 | $l_1$ = 14.18 |
| L = 8.92 | L = 10.32 |
| $n_{00}$ = 1.55 | $n_{00}$ = 1.55 |
| $n_{10}$ = −0.04465 | $n_{10}$ = −0.03740 |
| $n_{11}$ = −0.01717 | $n_{11}$ = −0.01033 |
| $\Delta n$ = 0.049 | $\Delta n$ = 0.036 |
| R = 0.5 | R = 0.5 |

It will be seen that TC is short when $\Delta n$ assumes the same value as that in the lens shown in Table 1, as shown in Embodiment 3, and that $\Delta n$ is small when TC assumes the same value as that in the lens shown in Table 1, as shown in Embodiment 4.

Further, in the index distribution type lens used in the present invention, if $\Delta n$ on the lens end surface adjacent to the object side is $\Delta n_1$ and $\Delta n$ on the lens end surface adjacent to the image plane side is $\Delta n_2$, it is desirable that $\Delta n_1$ and $\Delta n_2$ satisfy the following condition:

$$\frac{\Delta n_2}{\Delta n_1} \geq 1.5 \quad (15)$$

This is because the difference between $l_0$ and $l_1$ becomes small if the values of $\Delta n_1$ and $\Delta n_2$ are outside the range shown in formula (15).

Figure 4:
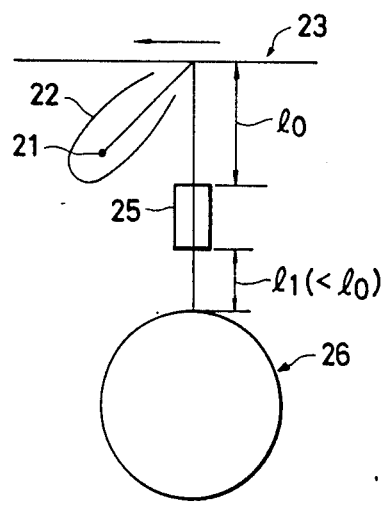
FIG. 4 shows an embodiment of the copying apparatus using the projection device according to the present invention.

As shown in FIG. 2, $l_0 = l_1$ in the conventional device, but as described above, $l_0 > l_1$ can be provided in the projection device of the present invention shown in FIG. 4 and therefore, the distance TC between the object and the formed image thereof can be shortened with the arrangement of the illuminating optical systems 21 and 22 remaining unchanged, and thus a thin type copying apparatus can be provided. Also, considering a case where the distance TC between the object and formed image thereof keeps the same value as that in the prior art, the refractive index difference $\Delta n$ can be made small and thus, it becomes possible to obtain an index distribution type lens which is similar in performance to the conventional index distribution type lens and easy to make.

The above-described embodiments show an example in which the present invention is applied to a copying apparatus as shown in FIG. 4, whereas the projection device according to the present invention is not restricted to the above-described embodiments, but is applicable to an image reading apparatus such as the facsimile apparatus as previously described or to other recording apparatuses or the like.

As described above, in the projection device according to the present invention, use is made of lens elements having a refractive index distribution which depends not only on the distance r from the optic axis but also on the distance x in the direction of the optic axis or an imaging optical system in which said elements are arranged in the form of an array, whereby it is made possible to dispose an optical member for illuminating the object even if, for example, the distance between the object and the formed image thereof is shortened.

We claim:

1. A projection device having:
an illuminating system for illuminating an object; and
an index distribution type lens for projecting the image of said object, said lens having a refractive index distribution substantially proportional to the square of the distance from the optic axis in a cross-section perpendicular to the optic axis and a refractive index distribution monotonously varying in the direction of the optic axis.

2. A projection device according to claim 1, wherein said index distribution type lens is arranged in the form of a one-dimensional array.

3. A projection device according to claim 1, wherein the refractive index distribution of said index distribution type lens is represented by the following equation:

$$n(r, x) = (n_{00} + n_{01} \cdot x) + (n_{10} + n_{11} \cdot x)r^2 + \ldots$$

where r is the height from the optic axis, x is the distance along the optic axis from the vertex adjacent to the object side, and $n_{00}$, $n_{01}$, $n_{10}$, $n_{11}$, ... are constants.

4. A projection device according to claim 1, wherein the refractive index distribution of said index distribution type lens is represented by the following equation:

$$n(r, x) = n_{00} + (n_{10} + n_{11} x)r^2 + \ldots$$

where $n_{00}$, $n_{10}$, $n_{11}$, ... are constants, r is the height from the optic axis, and x is the distance along the optic axis from the vertex adjacent to the object side.

5. A projection device according to claim 1, wherein the spacing between said index distribution type lens and said object is longer than the spacing between said index distribution type lens and the image plane.

6. A projection device according to claim 5, wherein said index distribution type lens satisfies the following condition:

$$\frac{\Delta n_2}{\Delta n_1} \geq 1.5$$

where $\Delta n_1$ is the maximum refractive index difference in the radial direction on the end surface of said lens which is adjacent to the object side, and $\Delta n_2$ is the maximum refractive index difference in the radial direction on the end surface of said lens which is adjacent to the image plane side.

7. An index distribution type lens having
a refractive index distribution substantially proportional to the square of the distance from the optic axis in a cross-section perpendicular to the optic axis; and
a refractive index distribution monotonously varying in the direction of the optic axis.

8. A lens according to claim 7, wherein the incidence surface of said lens is a plane perpendicular to the optic axis.

9. A lens according to claim 7, wherein the refractive index distribution of said index distribution type lens is represented by the following equation:

$$n(r, x) = (n_{00} + n_{01} \cdot x) + (n_{10} + n_{11} \cdot x)r^2 + \ldots$$

where r is the height from the optic axis, x is the distance along the optic axis from the vertex adjacent to the object side, and $n_{00}$, $n_{01}$, $n_{10}$, $n_{11}$, ... are constants.

10. A lens according to claim 7, wherein the refractive index distribution of said index distribution type lens is represented by the following equation:

$$n(r, x) = n_{00} + (n_{10} + n_{11} x)r^2 + \ldots$$

where $n_{00}$, $n_{10}$, $n_{11}$, ... are constants, r is the height from the optic axis, and x is the distance along the optic axis from the vertex adjacent to the object side.

11. A projection device according to claim 8, wherein said index distribution type lens satisfies the following condition:

$$\frac{\Delta n_2}{\Delta n_1} \geq 1.5$$

where $\Delta n_1$ is the maximum refractive index difference in the radial direction on the end surface of said lens which is adjacent to the object side, and $\Delta_{n2}$ is the maximum refractive index difference in the radial direction on the end surface of said lens which is adjacent to the image plane side.

* * * * *

UNITED STATES PATENT AND TRADEMARK OFFICE
CERTIFICATE OF CORRECTION

PATENT NO. : 4,696,552

DATED : September 29, 1987

INVENTOR(S) : JUN HATTORI, ET AL.

It is certified that error appears in the above-identified patent and that said Letters Patent is hereby corrected as shown below:

COLUMN 2

Line 45, "quadratio" should read --quadratic--.
Line 59, "$N_{00}$" should read --$n_{00}$--.
Line 60, "$N_{10}<0.$" should read --$n_{10}<0.$--.
Lines 63-64, "$l_0 = l_1 = - \frac{1}{n_{00} \cdot a} \cdot \frac{aL}{2}$"

should read

--$l_0 - l_1 = - \frac{1}{n_{00} \cdot a} \cdot \tan \frac{aL}{2}$--.

COLUMN 3

Line 46, after "and" insert --in Fig. 4--.
Line 48, "Fig. 2" should read --Fig. 3--.

COLUMN 5

Line 7, "$l_0=l$" should read --$l_0=l_1,$--.
Line 8, "l" should be deleted.

UNITED STATES PATENT AND TRADEMARK OFFICE
CERTIFICATE OF CORRECTION

PATENT NO. : 4,696,552

DATED : September 29, 1987

INVENTOR(S) : JUN HATTORI, ET AL.

Page 2 of 2

It is certified that error appears in the above-identified patent and that said Letters Patent is hereby corrected as shown below:

COLUMN 8

Line 42, "$\Delta_{n2}$" should read --$\Delta n_2$--.

Signed and Sealed this

Twelfth Day of July, 1988

Attest:

DONALD J. QUIGG

Attesting Officer

Commissioner of Patents and Trademarks